US008687260B2

(12) United States Patent
Jacobs (10) Patent No.: US 8,687,260 B2
(45) Date of Patent: Apr. 1, 2014

(54) SOLID-STATE OPTICAL MODULATOR

(75) Inventor: Simon Joshua Jacobs, Lucas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1234 days.

(21) Appl. No.: 11/966,314

(22) Filed: Dec. 28, 2007

(65) Prior Publication Data

US 2009/0168136 A1    Jul. 2, 2009

(51) Int. Cl.
*G02F 1/13*    (2006.01)
*G02F 1/01*    (2006.01)

(52) U.S. Cl.
USPC .......................................................... 359/246

(58) Field of Classification Search
USPC .......................................................... 359/246
See application file for complete search history.

(56) References Cited

U.S. PATENT DOCUMENTS

| 5,007,716 | A | * | 4/1991 | Hanyu et al. | 349/172 |
| 5,035,488 | A | * | 7/1991 | Kobayashi | 349/192 |
| 5,229,773 | A | | 7/1993 | Dawen et al. | |
| 5,327,263 | A | * | 7/1994 | Katagiri et al. | 358/471 |
| 5,574,593 | A | * | 11/1996 | Wakita et al. | 359/259 |
| 6,320,639 | B1 | * | 11/2001 | Mori et al. | 349/155 |
| 6,919,982 | B2 | * | 7/2005 | Nimura et al. | 359/254 |
| 2006/0132424 | A1 | * | 6/2006 | Foo et al. | 345/102 |

OTHER PUBLICATIONS

Wikipedia definition of Liquid Crystal, specifically of Chiral liquid crystals, pp. 4-5, last modified Oct. 12, 2010.*

* cited by examiner

*Primary Examiner* — David N Spector
(74) *Attorney, Agent, or Firm* — Warren L. Franz; Wade J. Brady, III; Frederick J. Telecky, Jr.

(57) ABSTRACT

A spatial light modulator comprises a solid-state chiral material disposed between electrodes such that the polarization direction of the polarized light incident thereto can be controlled through an electrical field established between the electrodes.

8 Claims, 10 Drawing Sheets

SOLID-STATE OPTICAL MODULATOR

TECHNICAL FIELD OF THE DISCLOSURE

The technical field of this disclosure relates to the art of optical modulators, and more particularly to the art of solid-state electro-optic modulators.

BACKGROUND OF THE DISCLOSURE

Optical modulators are optical devices in which signal-controlled elements are used to modulate incident light. Microelectromechanical system (MEMS) based spatial light modulators and electro-optical modulators are two types commonly used optical modulators. A typical MEMS based spatial light modulator comprises an array of mechanically deflectable elements, such as deflectable mirror plates of micromirror devices (e.g. DLP® by Texas Instruments, Inc.) or movable membranes (e.g. IMOD by QualComm, Inc.). Electro-optic modulators are optical modulators whose signal controlled elements exhibit electro-optic effects, based on the effect of which modulations are performed. A typical electro-optical modulator employs nematic materials, which are commonly known as liquid-crystal materials, such as Liquid-crystal-on-silicon (LCoS). A common feature of these nematic materials in existing electro-optical modulators is that the mass centers of nematic molecules have no long range order, and these molecules tend to be parallel to common axes.

Because operations of current MEMS based spatial light modulators are based upon the mechanical movements of deflectable elements (e.g. the mirror plates of micromirror devices); and the mechanical movements often take longer time (e.g. 20 ms or longer) to respond to control signals, performance of the MEMS based spatial light modulators is limited by the slow response time of the mechanical elements. Moreover, mechanical elements often occupy spaces that are much larger than the smallest size of a typical semiconductor circuit (e.g. an addressing electrode and electrical circuit used for deflecting the movable element) achievable by current integrated circuit fabrication technologies. Incorporation of mechanical elements certainly encumbers achieving small size MEMS based spatial light modulators.

Current electro-optical spatial light modulators also have larger response time, which significantly limits their applications. For spatial light modulators based on nematic materials, the response time of the spatial light modulator is determined by the response time of nematic molecules of the spatial light modulator, which is typically in the order of microseconds. The response time of the spatial light modulator can be even larger due to re-orientations of nematic molecules during state transitions. Moreover, the delicate property due to the intrinsic liquid-crystal natural of the nematic based spatial light modulator limits the application of existing nematic based spatial light modulators.

Therefore, it is always desired for spatial light modulators that are preferably robust, reliable, fast, high resolution, and lower power-consumptive.

SUMMARY

In one example, a spatial light modulator for use in a display system is provided herein. The spatial light modulator comprises: an array of light modulating devices, each comprising: a solid-state chiral material that is disposed between first and second electrodes such that an electrical field can be established across the solid-state chiral material.

In another example, a method of displaying an image is provided herein. The method comprises: providing a spatial light modulator that comprises an array of individually addressable pixels, wherein each pixel comprises: a solid-state chiral material that is disposed between first and second electrodes such that an electrical field can be established across the solid-state chiral material; directing a beam of polarized light to the pixels of the spatial light modulator; modulating the pixels of the spatial light modulator based on the image to be displayed by adjusting the electrical fields applied to the solid-state chiral materials of the pixels; passing the light from the pixels of the spatial light modulator through a polarizer; and directing the light after the polarizer onto a display target.

In yet another example, a display system is provided. The system comprises: a light source providing a light; a spatial light modulator comprising an array of pixels, each pixel comprising: a solid-state chiral material that is disposed between first and second electrodes such that an electrical field can be established across the solid-state chiral material; a first polarizer having a first polarization direction; and a second polarizer having a second polarization direction that is substantially perpendicular to the first polarization direction; and a set of optical elements for directing the light toward the spatial light modulator and for directing the light from the spatial light modulator onto a display target.

In yet another example, a method of making a spatial light modulator is provided. The method comprises: providing a semiconductor substrate having formed thereon a first array of electrodes and circuits; forming a layer of solid-state chiral material on the provided semiconductor substrate; and forming a second array of electrodes on the formed solid-state chiral material.

In still yet another example, a method of forming a spatial light modulator is provided. The method comprises: providing a semiconductor substrate having formed thereon a first array of electrodes that are electrically conductive; providing a light transmissive substrate having formed thereon a second array of electrodes that are transparent and electrically conductive; forming a solid-state chiral material on the semiconductor substrate or the light transmissive substrate; and assembling the light transmissive substrate and the semiconductor substrate.

In yet another example, a method of making a spatial light modulator is provided. The method comprises: providing a frame that comprises a light transmissive substrate and a semiconductor substrate that is spaced apart from the light transmissive substrate so as to form a gap therebetween, wherein the light transmissive substrate and the semiconductor substrate each comprise an array of electrodes; and inserting a solid-state chiral material into the gap between the light transmissive substrate and the semiconductor substrate.

In another example, a wafer is disclosed herein. The wafer comprises: a set of die areas, each die area comprises first and second array of electrodes disposed therebetween a chiral material that is in the solid-state.

In still yet another example, a method of making a spatial light modulator is disclosed. the method comprises: providing a semiconductor wafer that comprises a set of die areas, in each of which a first array of electrodes and circuits are formed; forming a layer of solid-state chiral material on the semiconductor wafer in each die area; forming a second array of electrodes on the solid-state chiral material; and singulating the dies from the semiconductor wafer.

In yet another example, a method of making a spatial light modulator is disclosed. The method comprises: providing a transparent wafer that comprises a first set of die areas; forming an array of transparent electrodes in each one of the die areas of the first set of die areas in the transparent wafer; forming a layer of solid-state chiral material on the transparent substrate; and assembling the first set of dies to a second set of dies on a semiconductor wafer having formed thereon an array of non-transparent electrodes and circuits in each die area of the second set of die areas; and singulating the assemblies so as to obtain individual spatial light modulators.

DETAILED DESCRIPTION OF SELECTED EXAMPLES

Disclosed herein is a solid-state electro-optic modulator that comprises a solid-state chiral material disposed between first and second electrodes such that the polarization direction of the polarized light (electromagnetic wave) incident thereto can be modulated through an electrical field established between the first and second electrodes.

A "chiral material" is material that comprises chiral objects of substantially the same handedness. A chiral object (e.g. molecules and molecule combinations with helical chiral microstructures) is a three-dimensional body whose property renders it non-congruent with its mirror image by translation or rotation. The term "handedness", as known by those skilled in the art, refers to whether a chiral object is "right-handed" or "left-handed." If a chiral object is left-handed (right-handed), its mirror image is right-handed (left handed). In this regard, the mirror image of a chiral object is its enantiomorph with opposite handedness. The chiral objects can be randomly or regularly orientated (resulting in a dominant orientation or a principal optical axis); and uniformly or non-uniformly distributed within the space of the modulator.

A solid-state chiral material is a chiral material that comprises chiral objects whose mass centers have a long range order as compared to that of nematic liquid-crystal materials. For example, the mass centers of the chiral objects in a solid-state chiral material can be arranged into a 2-dimensional or 3-dimensional lattice with certain lattice parameters. It is noted that even though the chiral objects are arranged such that the mass centers of the chiral objects exhibit a long range order, the chiral objects may be arranged randomly or regularly. The chiral material may or may not exhibit a principal optical axis. Moreover, a bulk body composed of a chiral material may also have defects and/or vacancies and/or even other non-chiral objects though it is less preferred.

In the following, the solid-state electro-optic modulator will be discussed with selected examples. It will be appreciated by those skilled in the art that the following discussion is for demonstration purpose, and should not be interpreted as a limitation. Many variations within the scope of the disclosure are also applicable. In the following, "light" is referred to electro-magnetic waves with exceedingly wide range of wavelengths, depending upon specific applications. For example, the "light" or the illumination can be visible light when the solid-state electro-optical modulator is used in an image display system. The light can alternatively be infrared or ultraviolet light or light with other wavelengths. For given light with a specific wavelength or a specific wavelength range, the chiral material of the solid-state electro-optical modulator is capable of modulating the given light by rotating the polarization direction of the given light.

Figure 1:
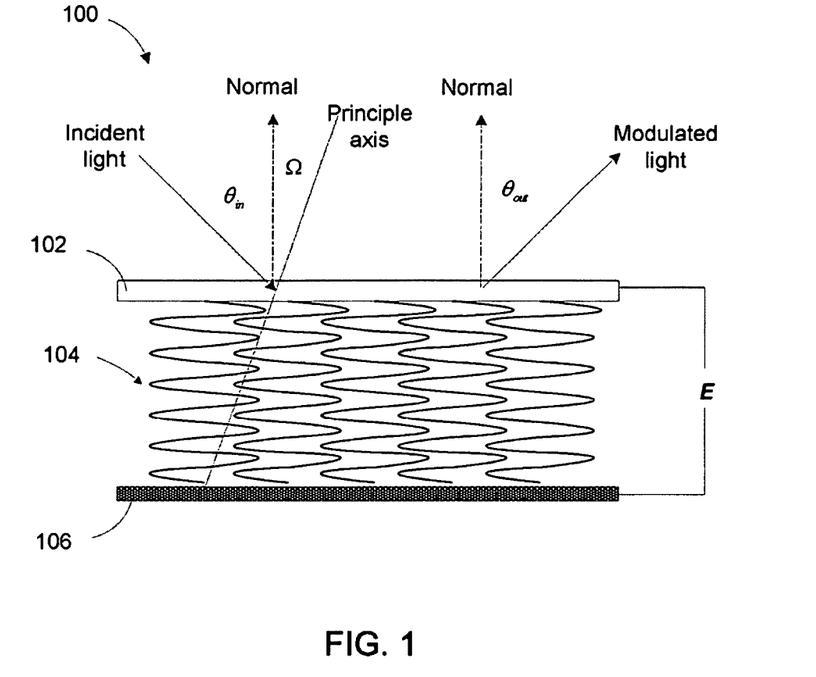
FIG. 1 schematically illustrates a cross-sectional view of a solid-state electro-optical modulator.

Referring to the drawings, FIG. 1 schematically illustrates a cross-sectional view of an exemplary solid-state electro-optic modulator (hereafter SSEO modulator). The SSEO modulator (100) comprises solid-state chiral material 104 disposed between electrodes 102 and 106 that are provided for establishing electrical field E across the solid-state chiral material (104). Electrode 102 is electrically conductive and transparent to the incident light such that the illumination light to be modulated can pass through electrode 102 and are incident to chiral material 104. For example, electrode 102 is preferably capable of passing 85% or more, 90% or more, 95% or more of the incident illumination light. The transparent electrode (102) may have other features, such as an anti-reflection layer for improving the transmission of the incident light.

Electrode 106 is electrically conductive, and preferably has a surface that is reflective to the illumination light to be modulated, such as a surface capable of reflecting 50% or more, 70% or more, 85% or more, and 95% or more of the illumination light to be modulated. The reflective surface of electrode 106 can be a surface of a single material that is reflective to the incident light, or alternatively, a reflective layer coated on a non-reflective material. In another example, the surface of electrode 106 may comprise a light absorbing layer for absorbing light incident thereto. For example, the light absorbing layer can be a layer that is capable of absorbing 50% or more, 70% or more, 85% or more, and 95% or more of the light incident thereto.

The solid-state chiral material (104) is preferably, though not required, an inorganic material with molecules of helical chiral microstructures, such as $MgF_2$ and many other suitable materials. For example, the chiral material can be any suitable inorganic solid-state materials, and more preferably (though not required), an inorganic solid-state material that is compatible with (e.g. can be fabricated by) standard thin film processing and with a high dielectric breakdown strength. A dielectric breakdown strength is referred to as the maximum electric field strength that the dielectric material can withstand intrinsically without breaking down, i.e., without experiencing failure of its dielectric (or insulating) properties. Other exemplary chiral materials can be metal or semiconductor oxides, such as $SiO_2$ and $Al_2O_3$. Mass centers of the molecules of the solid-state chiral material exhibit a long range order as compared to the molecules in the liquid-crystal state. In other words, chiral material 104 exhibits macro properties of solid-state materials, such as specific melting points. Because the solid-state chiral material (104) is in solid-state and exhibits properties of solid-state materials, it can be more thermally and mechanically stable than many other nematic materials including liquid-crystal materials. This property can be of great importance in designing, fabricating, assembling, delivering, installing, and maintaining SSEO modulators using the solid-state chiral materials. Application of such SSEO modulators may not require additional containers as compared to nematic materials (e.g. liquid-crystal materials) in current spatial light modulators.

Molecules of chiral material 108 have substantially the same handedness—right-handedness or left-handedness, depending upon the specific material. The molecules can be regularly arranged within the space between electrodes 102 and 106 such that a dominant or principal optical axis can be defined. As schematically illustrated in FIG. 1, in the plane of the principal axis and the normal direction of solid-state chiral material 104, the principal axis has a principal angle Ω with the normal direction. Alternatively, the molecules can be randomly disposed between electrodes 102 and 106 such that there are no principal optical axes or dominant optical axes.

Within the space between electrodes 102 and 106, molecules of the chiral material can be uniformly distributed such, even though defects and/or vacancies may exit within the space. Alternatively, molecules of the chiral material can non-uniformly fill in the space between electrodes 104 and 106. For example, molecules of the chiral material (104) can fill in the space between electrodes 102 and 106 in forms of molecular clusters with each molecular cluster comprising a group of molecules. In this instance, mass centers of the molecules may or may not maintain a long range order; but the mass centers of the molecular clusters exhibit a long range order. The molecules in each cluster may or may not be regularly oriented and/or distributed, that is, optical axes of the individual molecules in the cluster may or may not define a dominant or principal optical axis; and the mass centers of the individual molecules in each cluster may or may not regularly arranged. Even though not required, it is preferred that there is substantially no air gap between the solid-state chiral material (104) and the electrodes (102 and 106). The solid-sate chiral material (104), however, can be connected to each one of the electrodes (102 and 106) through other suitable layers or elements. For example, an optical index matching layer, which is transmissive to the illumination light, can be disposed between the lower surface of the transmissive electrode (102) and the top surface of solid-state chiral material 104 so as to matching the refractive indices of the transmissive electrode 102 and solid-state chiral material 104. To avoid unwanted displacement of the solid-state chiral material (104) inside the space between electrodes 102 and 106, a bonding layer (or layers) can be applied to secure the attachment of chiral material (104) to electrode 106 and/or to transmissive electrode 102.

The solid-state chiral material (104) exhibits an electro-optical property. Specifically, a beam of polarized incident light changes its polarization direction depending upon the electrical field E applied across the solid-state chiral material (104) as the polarized light travels inside the solid-state chiral material (104). As schematically illustrated in FIG. 1, polarized incident light passing through electrode 102 is incident to chiral material 104 with an incident angle $\theta_{in}$ between the incident light and the normal direction of the solid-state chiral material (104). The polarized light propagates within the solid-state chiral material (104); and is reflected by the reflective surface of electrode 106. The reflected polarized light from electrode 106 propagates within the solid-state chiral material (104) towards transmissive electrode 102; and exits from transmissive electrode 102. During the propagation within the solid-state chiral material towards electrode 106 and towards transmissive electrode 102, the polarized light changes its polarization direction depending upon the electrical field E (e.g. the amplitude of electrical field E). As a consequence, the light exiting from the solid-state chiral material (hereafter modulated light) may have a different polarization direction than the incident light. The reflection angle $\theta_{out}$ between the modulated light and the normal direction of the solid-state chiral material (104) can be the same as the incident angle $\theta_{in}$.

Figure 2:
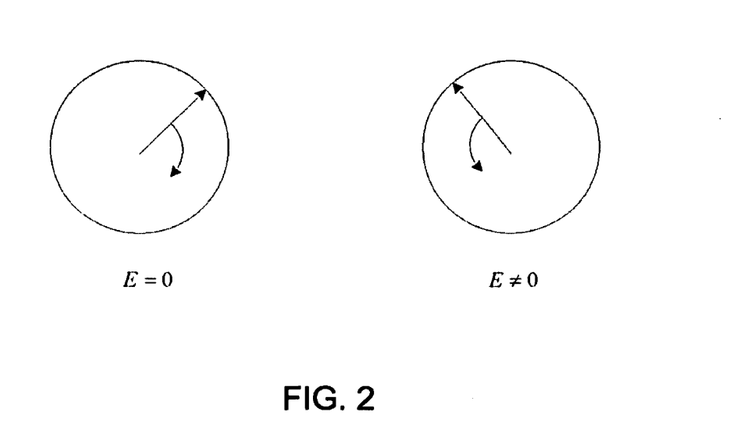
FIG. 2 schematically illustrates the variation of the polarization direction of the modulated light from the solid-state electro-optical modulator in FIG. 1.

For demonstration purpose, FIG. 2 schematically illustrates the variation of the polarization direction of the modulated light over the applied electrical field E. Referring to FIG. 2, when the chiral material is a left-handed chiral material, the polarization plane of the modulated light is rotated left-handedly in relation to the polarization plane of the incident light before modulation when the electrical field E is substantially zero, as shown in the left panel of FIG. 2. When electrical field is non-zero, the polarization plane of the modulated light is rotated right-handedly relative to the incident light before modulation, as shown in the right panel of FIG. 2. Similarly, when the chiral material is a right-handed material, the polarization plane of the modulated light is rotated right-handedly relative to the incident light before modulation in the absence of the electrical field; and the polarization plane of the modulated light is rotated left-handedly relative to the incident light before modulation in the presence of a non-zero electrical field.

The amount of the rotated angle of the polarization plane may follow the Kerr effect, wherein the resulted refraction index difference is proportional to the electrical field squared. Alternatively, the amount of the rotated angle of the polarization plane may follow the Pockel effect, wherein the resulted refraction index difference is proportional to the electrical field quadrupled.

In modulation operations, incident light is incident onto the modulator at an incident angle $\theta_{in}$. The incident light angle can be of any values, though it is preferred not equal to the principal angle Ω that is defined as the angle between the principal axis of the solid-state chiral material (104) and the normal direction of the solid-state chiral material (104).

Because the modulation of the SSEO modulator (100) as described above with reference to FIG. 1 is accomplished through the electro-optical property of the solid-state chiral material (104), the response time of the solid-state electro-optical modulator is substantially determined by the electro-optical response time of the solid-state chiral material (104) to the applied driving signal (e.g. the electrical field E), which can be in the order of nanoseconds. This response speed, which is proportional to the reciprocal of the response time, can be 1000 times faster than the response speed of typical existing liquid-crystal based or micromirror based optical modulators. Accordingly, the SSEO modulator as discussed above can be operated at a speed in the order of GHZ; and the time period for switching the SSEO modulator from one state (e.g. the OFF-state) to a different state (e.g. the ON-state) and stabilizing at the different state can be 500 nanoseconds or less, 200 nanoseconds or less, 100 nanoseconds or less, 50 nanoseconds or less, 20 nanoseconds or less, and 10 nanoseconds or less.

Due to the absence of mechanically movable elements and the fact that the physical size of the SSEO modulator can be determined solely on the size(s) of the electrodes or the electrical circuit(s) connected to the electrodes, the SSEO modulator can be much smaller than typical existing MEMS-based spatial light modulators. With the current integrated circuit fabrication techniques, electrodes and electrical circuits (e.g. memory cells) can be made with sizes of sub-microns. Accordingly, a SSEO modulator can have a size in the order of sub-microns. Small size SSEP modulators can be of great importance in display systems. Specifically, small size SSEO modulators enable a spatial light modulator to be used in an image display system to have a native resolution (the total number of optical modulators, which are referred to as pixels of the spatial light modulator) of 640×480 (VGA) or higher, such as 800×600 (SVGA) or higher, 1024×768 (XGA) or higher, 1280×1024 (SXGA) or higher, 1280×720 or higher, 1400×1050 or higher, 1600×1200 (UXGA) or higher, 1920×1080 or higher, $1 \times 10^6$ or higher, $1 \times 10^7$ or higher, $1 \times 10^8$ or higher, $1 \times 10^9$ or higher, or integer multiples and fractions of these resolutions. Of course, other resolutions are also applicable.

Because the physical shape of a SSEO modulator can be determined solely on the physical shape of the electrodes (e.g. electrode 102 and 106) of the SSEO modulator, the SSEO modulator can be formed into any desired shapes, such as circular, rectangular, square, trapezoidal, hexagonal, and many other shapes. When multiple SSEO modulators are to be used together, such as an array of SSEO modulators in a spatial light modulator of a display system or in a optical switch in optical signal communications, the chiral materials of individual SSEO modulators in the array can be connected together so as to form a substantially continuous solid-state chiral material layer. Of course, the solid-state chiral materials of the individual SSEO modulators can be connected in any desired shapes, such as strips, frames, blocks, and segments. As a way of example, FIG. 3a schematically illustrates a spatial light modulator comprising an array of SSEO modulators as discussed above with reference to FIG. 1.

Figure 3A:
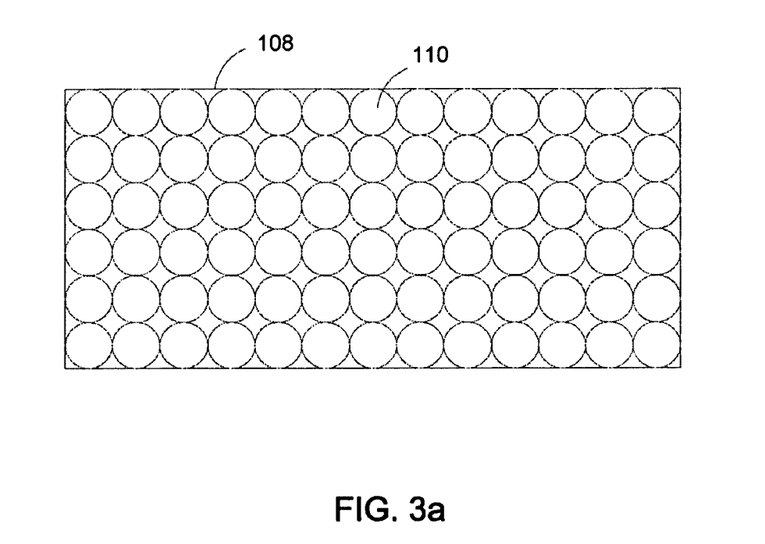
FIG. 3a schematically illustrates a top view of an exemplary spatial light modulator comprising an array of solid-state electro-optical modulators in FIG. 1.

In the example as shown in FIG. 3a, the SSEO modulators (e.g. SSEO modulator 110) of SSEO modulator array 108 in a spatial light modulator are illustrates as dashed circles. Each SSEO modulator is an individually addressable pixel of the spatial light modulator. Operational states of the pixels (SSEO modulators) are controlled by the individual electrical fields applied to the solid-state chiral materials. In order to individually control the SSEO modulators, each SSEO modulator can have a separate transmissive electrode (i.e. electrode 102 in FIG. 1); and the reflective electrodes (i.e. electrode 106 in FIG. 1) of the SSEO modulators may or may not be connected together. In another example, the transmissive electrodes of the SSEO modulators can be connected together; while the reflective electrodes of the SSEO modulators are separate. Regardless of different configurations of the electrodes, solid-state chiral materials of the SSEO modulators may or may not be form a continuous layer.

Figure 3B:
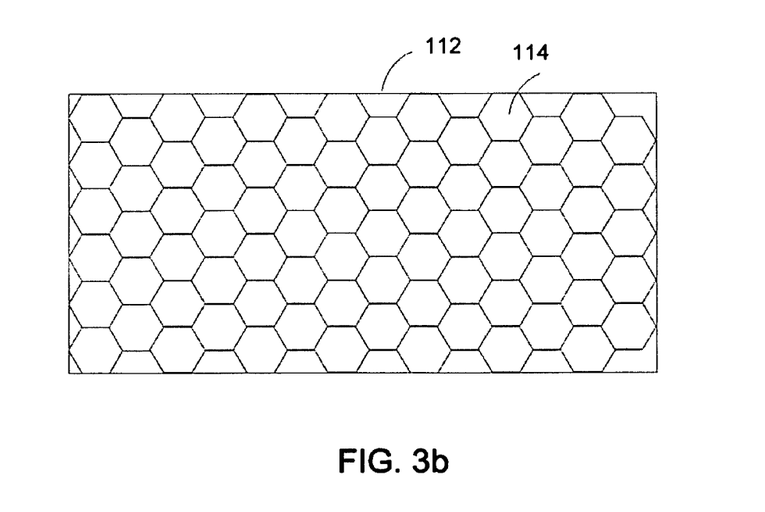
FIG. 3b schematically illustrates a top view of another exemplary spatial light modulator comprising an array of solid-state electro-optical modulators in FIG. 1.

Another exemplary spatial light modulator having an array of SSEO modulators as discussed above with reference to FIG. 1 is schematically illustrated in FIG. 3b.

Referring to FIG. 3b, the spatial light modulator comprises an array (112) of SSEO modulators (e.g. SSEO modulator 114) as discussed above with reference to FIG. 1. In this particular example, each SSEO modulator takes a shape of hexagon; and the SSEO modulators of the array form a hexagonally compact lattice in the spatial light modulator. With this hexagonal compact arrangement, the spatial light modulator can achieve higher fill factor than other configurations.

It is noted that the spatial light modulators in FIG. 3a and FIG. 3b are two of many possible examples. A spatial light modulator comprising SSEO modulators may have many other possible configurations. For example, a spatial light modulator may have any desired number of SSEO modulators. The SSEO modulators in a spatial light modulator may have any suitable shapes and/or spatial arrangements. In particular, a spatial light modulator and/or the array of SSEO modulators in the spatial light modulator may have a rectangular shape with an aspect ratio of 16:9, 4:3, 16:10, or other desired aspect ratios.

Figure 4A:
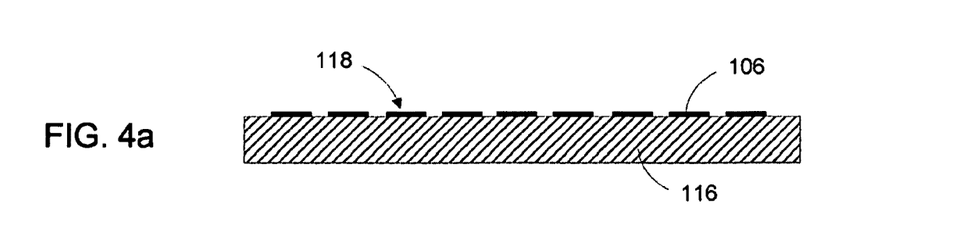
FIG. 4a through FIG. 4d schematically illustrate an exemplary method of making an spatial light modulator having an array of solid-state electro-optical modulators in FIG. 1.

The SSEO modulators and the array of SSEO modulators in a spatial light modulator as discussed above can be fabricated in many ways, one of which is schematically illustrated in FIG. 4a through FIG. 4d. Referring to FIG. 4a, semiconductor substrate 116, such as a silicon substrate, is provided. Electrode array 118 comprising an array of non-transparent electrodes 118, such as electrode 106, can be formed on substrate 116. Electrical circuits, such as memories, can also be formed on or in the semiconductor substrate (116) for controlling the electrical states of the electrodes in electrode array 118. Exemplary electrical circuits are schematically illustrated in FIG. 5a and FIG. 5b.

Figure 5A:
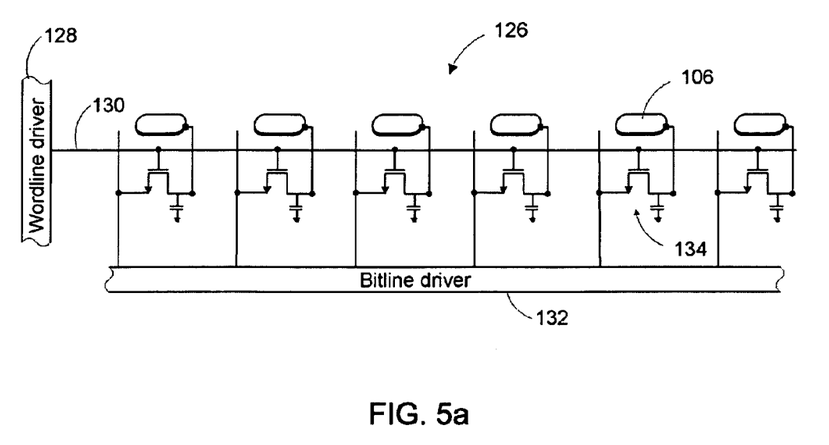
FIG. 5a illustrates a cross-sectional view of a portion of an exemplary electrode array for use in a spatial light modulator having an array of solid-state electro-optical modulators in FIG. 1.

Referring to FIG. 5a, a row of an exemplary electrical circuit array 126 is schematically illustrated therein. In this example, each one of the non-transparent electrodes (e.g. electrode 106) of the row is connected to a memory cell (e.g. memory cell 134) of a row in an array of memory cells. Each memory cell comprises a transistor, such as an NMOS or PMOS transistor, and a capacitor for storing a digital bit that corresponds to a high voltage or a low voltage. The voltage node of each memory cell, such as the node connecting the drain of the transistor and one of the metallic plates of the capacitor, is connected to a non-transparent electrode (e.g. electrode 106). Contents of the memory cells are written and accessed through wordlines (e.g. wordline 130) and bitlines, wherein the wordlines are connected to the gates of the transistors of the memory cells; and the bitlines are connected to the sources of the transistors of the memory cells. The wordlines can be connected to a wordline driver (128) that provides wordline signals for activating the memory cells. The bitlines can be connected to a bitline driver (132) for reading contents stored in the activated memory cells. In the example as shown in FIG. 5a, the memory cells in each row of the memory cell array are connected to one wordline. In another example, the memory cells in each row of the memory cell array can be connected to multiple wordlines such that different wordlines are connected to different memory cells. Other wordline connecting schemes are also applicable, which will not be detailed herein.

In the example shown in FIG. 5a, each memory cell has a capacitor that has a grounded metallic plate. In another example, the grounded metallic plates of the capacitors can be instead connected to a pumping line 136, as shown in FIG. 5b. The pumping line is capable of providing pumping signals whose voltage may vary over time and can be controlled so as to improve the performance of the memory cells.

Figure 5B:
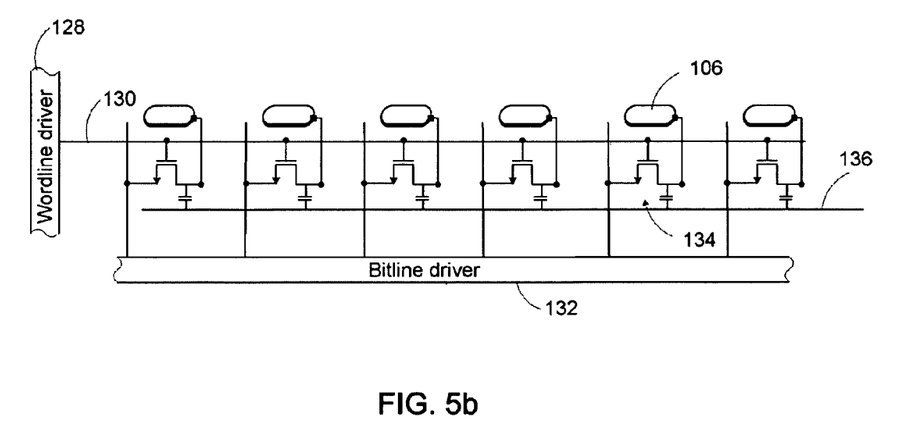
FIG. 5b illustrates a cross-sectional view of a portion of another exemplary array of electrodes for use in a spatial light modulator having an array of solid-state electro-optical modulators in FIG. 1.

It is noted that FIG. 5a and FIG. 5b illustrate only two of many possible examples. Other electrical configurations are also applicable. For example, instead of reflective electrodes (e.g. electrode 106), the memory cells in FIG. 5a or FIG. 5b can be connected to the transmissive electrodes, such as electrode 102 in FIG. 1, of the SSEO modulators.

Referring again to FIG. 4a, the electrical circuits can be formed using a standard integrated circuit fabrication method on the semiconductor substrate (116). The array of non-transparent electrodes (118) can be formed by depositing a layer of selected conductive material on the semiconductor substrate followed by lithographic patterning. The conductive layer is preferably non-transparent and reflective to the illumination light to be modulated. When a transparent or less reflective material is used, a reflective layer (not shown in the figure) can be formed on the formed non-transparent electrodes. Other optical layers, such as a light absorbing layer capable of absorbing 80% or more, 90% or more of the illumination light to be modulated, can be formed on the semiconductor substrate for reducing unwanted light scattering. When the solid-state chiral material is to be used, an electrically insulating layer can be further deposited on top of the electrodes. It is noted that each non-transparent electrode can be formed into any desired shapes, such as rectangular, square, trapezoid, circle, and many other desired shapes.

Figure 4B:
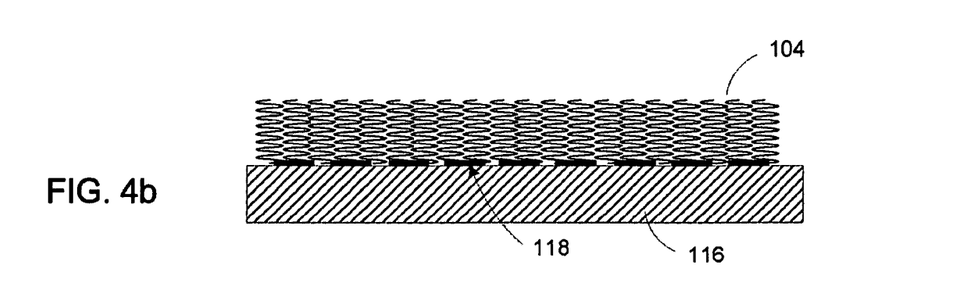

A solid-state chiral material (104) can be formed on the semiconductor substrate having formed thereon the non-transparent electrode array 118, as shown in FIG. 4b. Referring to FIG. 4b, the solid-state chiral material (104) can be formed using a glancing-angle-deposition method (GLAD) while rotating the semiconductor substrate (116) so as to construct the helical microstructure in molecules. After deposition, a patterning process may be performed so as to define individual pixels regions in the spatial light modulator. The patterning process may not be performed if the solid-state chiral material (104) is desired to be a substantially continuous layer across a group of SSEP modulators or all SSEP modulators in the spatial light modulator. An array of transparent (or semi-transparent) electrodes 120, such as transparent electrode 104, is formed on the solid-state chiral material (104), as shown in FIG. 4c.

Figure 4C:
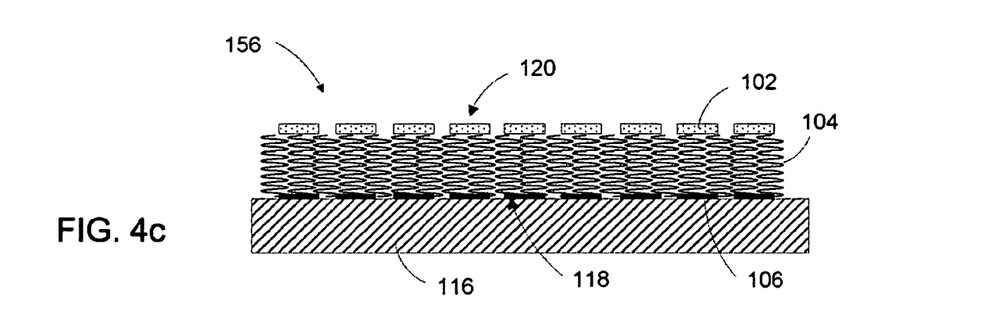

Referring to FIG. 4c, the transparent (or semi-transparent) electrode array 120 can be formed by depositing an electrode layer on the formed solid-state chiral material (104). The electrode layer comprises a material that is electrically conductive and transparent or semi-transparent to the illumination light that is to be used. The deposited electrode layer is patterned using a standard lithography technique such that each transparent electrode (e.g. electrode 102) is at a location corresponding to a location of at least one of the non-transparent electrodes (e.g. electrode 106) on the semiconductor substrate (116) so as to form paired electrodes (e.g. electrodes 102 and 106) with the solid-state chiral material being laminated therebetween.

The transparent electrode can be formed from any suitable electrical conductive materials. For example, the electrically conductive layer may comprise metalloid, metal alloys that comprise two or more elemental metals, intermetallic compounds, ceramics, organics, and/or polymers. An intermetallic compound may be composed of transition metals, including but not limited to early and late transition metals.

A ceramic is a compound wherein a metal (or metalloid) is bonded to a non-metal. The ceramic for the transmissive and electrically conductive layer can be an oxide, a nitride or a carbide of a metal or a metalloid, preferably a metal oxide or a metalloid oxide binary or ternary compound. Alternatively, the transparent electrode can be a multilayered structure comprising at least an electrical conductive and transparent layer. Other layers, such as mechanical enhancing layers, optical layers for enhancing transmission of the illumination light and/or for polarizing non-polarized illumination light, stiction layers for improving stiction of the transparent electrodes to the surface of the solid-state chiral material, or any combinations thereof, can be formed on either one of the top and bottom surfaces of the transparent electrode.

As a way of example, the transparent and electrically conductive layer may comprise: indium-titanate-oxide, $TiO_x$, doped $ZnO_x$ (such as $ZnO_x$ doped with aluminum, gallium, fluorine, boron, and indium), $SnO_2$, doped $SnO_2$ (such as $SnO_2$ doped with fluorine and antimony), $GdIn_xO_y$, doped $InO_x$ (such $InO_x$ doped with fluorine, tin and other suitable conductive organics and polymers, such as Baytron® conductive polymers (e.g. Baytron®)). Other transparent and conductive materials may also be used, such as $CdSn_xO_y$ (e.g. $Cd_2SnO_4$, $CdSnO_3$ and $CdIn_2O_4$), $An_2SnO_4$, $MgIn_2O_4$, Y doped $CdSb_2O_3$, $ZnSnO_3$, $GaINO_3$, $Zn_2In_2O_5$, and $In_4Sn_3O_{12}$, indium doped CdO, $CuAlO_2$, $Cu_2SrO_2$, and $CuGaO_2$ doped $Ga_2O_3$, $Ti_2O_3$, $PbO_2$, and $Sb_2O_5$.

When the solid-state chiral material is electrically conductive, a transparent and electrically insulating layer may be provided for avoiding electrical short between the solid-state chiral material and the transparent electrodes. Such electrically insulating and transparent layer can be separate from the transparent electrode, or can be a member of the multilayered transparent electrode.

The electrically insulating materials can be materials of high optical indices or materials of low optical indices. For example, the transparent and electrically insulating material with high optical indices can be $TiO_x$ and $Nb_2O_5$, $HfO_2$, $Ta_2O_5$, $ZrO_2$, $Si_3N_4$, $La_2O_3$, and $Nd_2O_3$. The transparent and electrically insulating materials with low optical indices can be $CaF_2$, $SiO_2$, $MgF_2$, and $Al_2O_3$. Of course, the materials listed above are for demonstration purposes, and are not intend to include all possible transparent and electrically conductive (or insulating) materials that are applicable in the SSEO modulators.

In selecting and applying the transparent and electrically conductive and insulating materials for the transparent electrodes (e.g. electrode 102 in FIG. 4c), the electrically conductive (and/or insulating) layers can themselves be single or multilayered structures to improve the anti-reflection properties of the layers. Alternatively, the electrically conductive and insulating layers can be alternatively stacked on the light transmissive substrate. For example, a material of high optical index can be stacked closer to the light transmissive substrate than those materials of low optical indices so as to form an optical index gradient from the surface of the transparent electrode to the air, which in turn improves the anti-reflection of the incident light.

Figure 6:
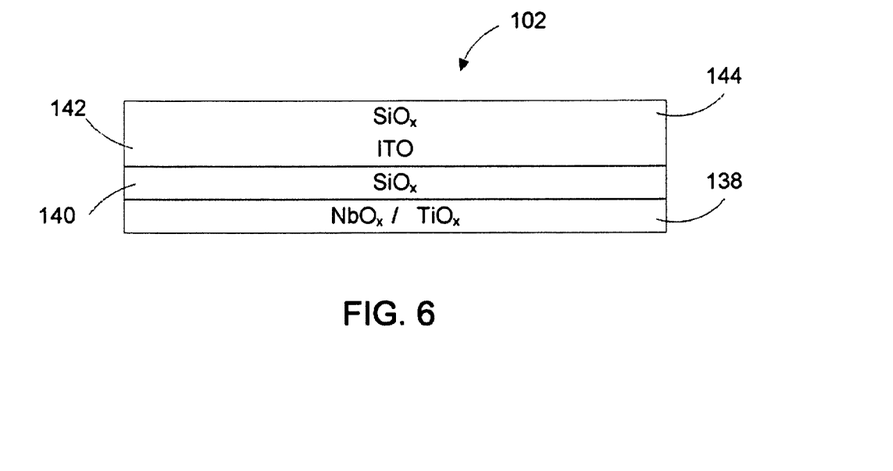
FIG. 6 illustrates a cross-sectional view of a portion of an exemplary transparent electrode for use in the solid-state electro-optical modulator in FIG. 1.

As a way of example, a laminated transparent electrode is schematically illustrated in FIG. 6. Referring to FIG. 6, the laminate transparent electrode (102) comprises niobium oxide layer (or $TiO_x$ layer) 138, silicon oxide layer 140, indium-titanium-oxide layer 142, and another silicon oxide layer 144. The niobium oxide layer (or TiO$_x$ layer) 138 can be provided for improving the attachment of the transparent electrode (102) to the solid-state chiral material (104 in FIG. 4c). The first silicon oxide layer 140 is provided for electrically insulating the ITO layer (142) and the niobium oxide layer (or TiO$_x$ layer) 138. The ITO layer (142) is provided for carrying electrical voltages for maintaining desired electrical fields across the solid-state chiral material (e.g. 104 in FIG. 4c). The second silicon oxide layer 144 can be provided for protecting the ITO layer (142). Both of the first and second oxide layers 140 and 144 can also be used as mechanical enhancing layer for enhancing the mechanical stability of the transparent electrode (102).

The layers of the multilayered transparent electrode (102) can be formed using any suitable film fabrication methods, such as chemical-vapor-deposition (CVD), physical-vapor-deposition (PVD), and physical-electro-chemical-vapor phase deposition (PECVD). As an example, the niobium oxide layer (138) may have a thickness of from 10 angstroms to 5000 angstroms, preferably from 50 angstroms to 200 angstroms, and more preferably around 100 angstroms. The optical index of this niobium oxide layer (138) is preferably from 1 to 2.7, more preferably from 1.5 to 2.5, and more preferably around 2.3. The first silicon oxide layer (140) may have a thickness of from 10 angstroms to 5000 angstroms, preferably from 50 angstroms to 500 angstroms, and more preferably around 400 angstroms. The optical index of this silicon oxide layer (140) is preferably from 1 to 1.7, more preferably from 1.2 to 1.5, and more preferably around 1.46. The indium-titanium-oxide layer (142) may have a thickness of from 10 angstroms to 5000 angstroms, preferably from 50 angstroms to 1000 angstroms, and more preferably around 600 angstroms. The optical index of this ITO layer (142) is preferably from 1 to 2.7, more preferably from 1.2 to 1.9, and more preferably around 1.8. The second silicon oxide layer (144) may have a thickness of from 10 angstroms to 5000 angstroms, preferably from 50 angstroms to 1500 angstroms, and more preferably around 900 angstroms. The optical index of this silicon oxide layer (144) is preferably from 1 to 1.7, more preferably from 1.2 to 1.5, and more preferably around 1.46.

Referring again to FIG. 4c, after forming the transparent electrode array 120 on solid-state chiral material 104, fabrication of the spatial light modulator (156) having a solid-state chiral material can be finished.

Figure 4D:
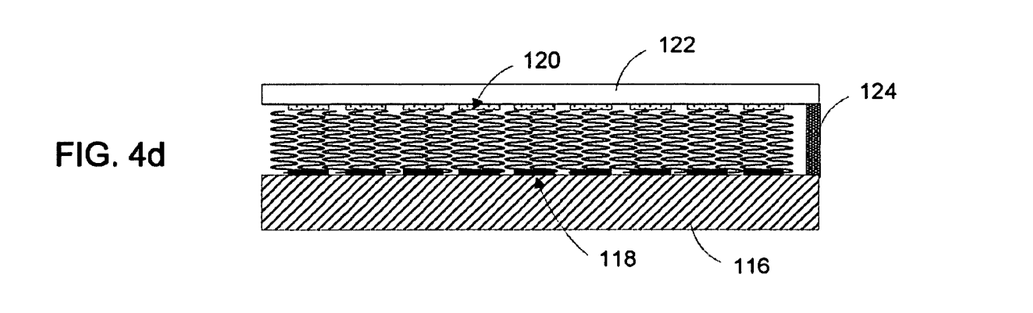

As an alternative feature, a protective substrate (122) can be formed on the transparent electrode array 120 for protecting the transparent electrode array 120, as well as other device components, as shown in FIG. 4d. The protection substrate (122) is transparent to the illumination light to be modulated; and preferably (though not required) has an optical index that matches the optical index of the transparent electrodes. The protection substrate (122) may have other suitable features, such as optical films formed thereon for improving the optical performance of the substrate (122), and/or mechanical.

It can be desired to extend electrical connections of the transparent electrodes to the lower semiconductor substrate, on which electrical contacting pads can be formed. The electrical contacting pads are often provided for connecting the SSEP modulators of the spatial light modulator to external electrical power(s) and data/control signals. Such electrical connection extension can be accomplished in many ways, one of which is through a shim (124) as schematically illustrated in FIG. 4d. The connection of the shim (124) to the electrodes is better illustrated in FIG. 7.

Figure 7:
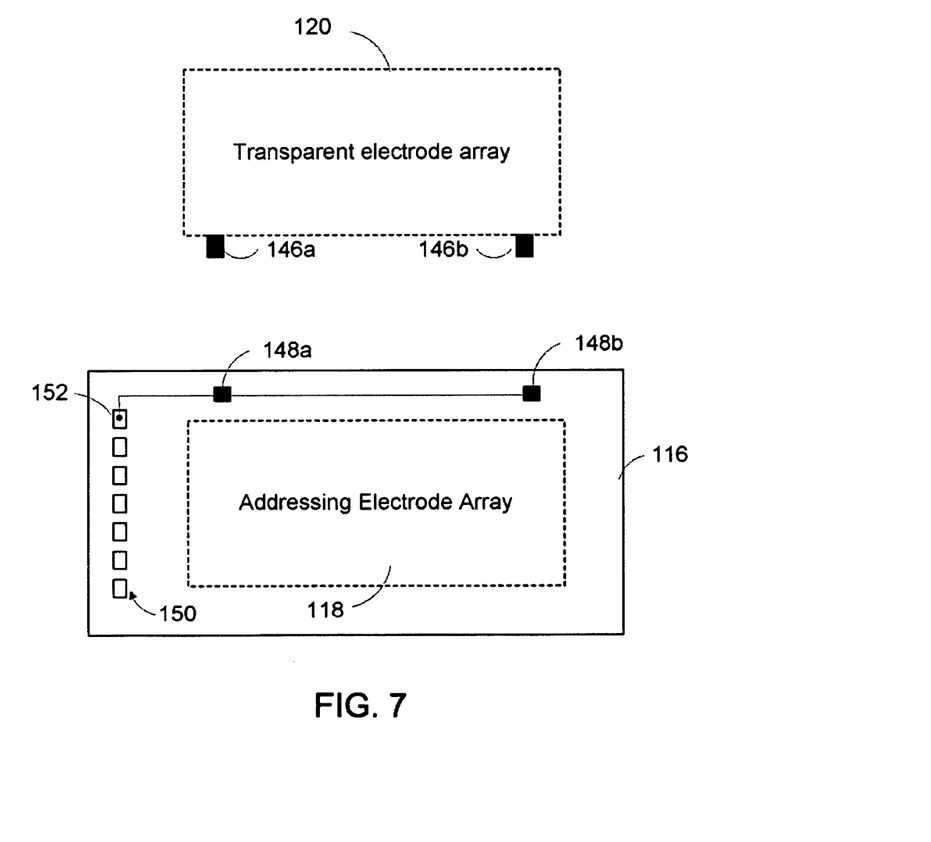
FIG. 7 schematically illustrates an exemplary electrical connection scheme for use in a spatial light modulator having an array of solid-state electro-optical modulators in FIG. 1.

Referring to FIG. 7, semiconductor substrate 116 has formed thereon an array of non-transparent electrodes 118. A set of electrical contacting pads 152 is deployed around an edge of the semiconductor substrate (116); and is preferably outside the electrode array 118. Shim contacts 148a and 148b each being electrically conductive are formed on the semiconductor substrate and are connected to one of the contacting pads (e.g. contacting pad 152).

The transparent electrode array (120), which is disposed such that the solid-state chiral material (not shown) is laminated between the transparent electrode array (120) and the non-transparent electrode array (118), is electrically connected to shim contacts 146a and 146b. Shim contacts 146a, 146b, 148a, and 148b are formed at locations such that shim contact 146a is aligned to and electrically connected to shim contact 148a; and shim contact 146b is aligned to and electrically connected to shim contact 148b. With such configuration, electrical connections to the transparent electrodes of the transparent electrode array (120) can be extended to the contacting pads (e.g. pad 152) on the semiconductor substrate (116).

Figure 8:
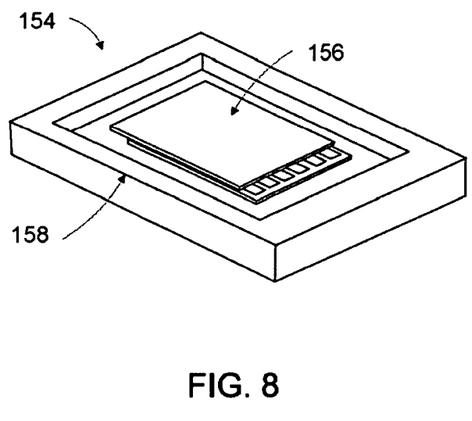
FIG. 8 schematically illustrates a perspective view of an exemplary package that comprises a spatial light modulator having an array of solid-state electro-optical modulators in FIG. 1.

The fabricated spatial light modulator (e.g. 156 in FIG. 4c or FIG. 4d) can be disposed in a package for protection as schematically illustrated in FIG. 8. Referring to FIG. 8, spatial light modulator 156 having an array of SSEO modulators as discussed above with reference to FIG. 4c or FIG. 4d is disposed on a supporting surface of a cavity in package substrate 158. A package cover can be attached to the surface of the package substrate (158) so as to seal the spatial light modulator (156) inside the cavity. The packaged spatial light modulator (154) can then be used in a display system. In other examples, especially when the spatial light modulator (156) comprises a protection substrate (e.g. protection substrate 122 as illustrated in FIG. 4d), the spatial light modulator (156) may not be packaged for protection.

Figure 9:
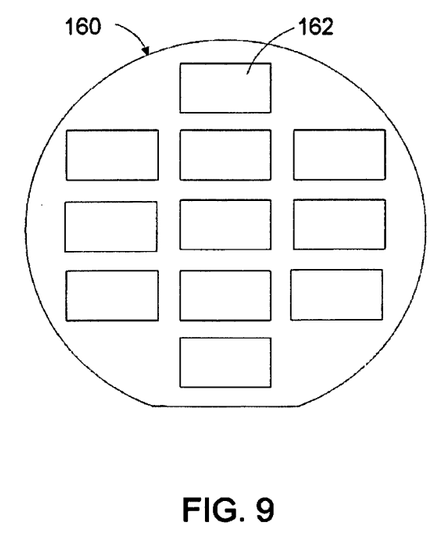
FIG. 9 schematically illustrates a method of making a spatial light modulator on wafer level, wherein each spatial light modulator comprises an array of solid-state electro-optical modulators in FIG. 1.

The above discussed spatial light modulator can be fabricated on the wafer level as demonstrated in FIG. 9. Specifically, a plurality of dies (e.g. die 162) can be formed in semiconductor wafer 160. A spatial light modulator can be formed on each one of the dies of the wafer (160) using a fabrication method as discussed above with reference to FIG. 4a through FIG. 4c or FIG. 4d. The spatial light modulators can be formed on the dies at the same time. After the fabrication, the dies are separated from the wafer so as to obtain individual spatial light modulators, such as spatial light modulator 156 in FIG. 4c or FIG. 4d.

During the wafer level fabrication, a packaging process can be performed so as to obtain packaged spatial light modulators, such as packaged spatial light modulator 154 as illustrated in FIG. 8. For example, before or after fabrications of individual dies but before singulation, a planar package substrate can be attached to the bottom surface (the surface opposite to the top surface wherein the non-electrodes are formed) of the semiconductor wafer. Other suitable materials, such as compliant die attach materials for improving thermal dissipation, for improving the mechanical stability, and/or for other desired purposes. Depending upon whether a package cover is expected for each spatial light modulator in the package, a spacer can be provided so as to maintain a constant distance between the package cover and the package substrate. Attachment of the spacer can be performed after the singulation.

Alternatively, individual package substrates, such as a package substrate with concaves, can be disposed at each location of the spatial light modulator and attached to the bottom surface of the semiconductor wafer.

Instead of continuously fabricating the components of the spatial light modulator on the semiconductor substrate as discussed above with reference to FIG. 4a through FIG. 4c, components of the spatial light modulator can be formed separately followed by assembly, as schematically illustrated in FIG. 10a through FIG. 10d.

Figure 10A:
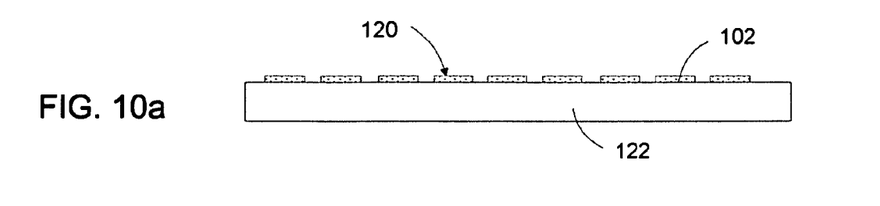
FIG. 10a through FIG. 10d schematically illustrate another exemplary method of making a spatial light modulator having an array of solid-state electro-optical modulators in FIG. 1.
Figure 10B:
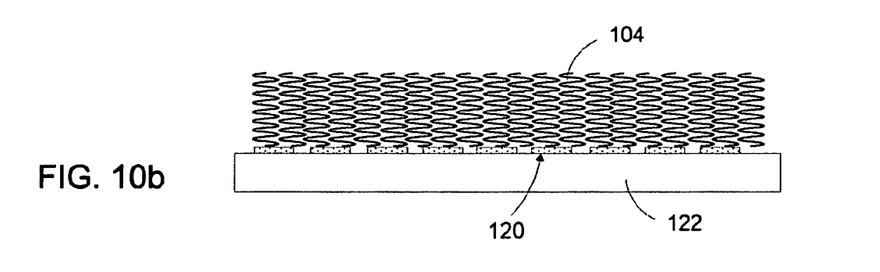

Referring to FIG. 10a, substrate 112 that is transparent to the illumination light to be modulated, such as glass, quartz, and sapphire, is provided. Electrode array 120 having an array of transparent electrodes, such as electrode 102, is fabricated on substrate 122. Other desired layers, such as optical layers, mechanical enhancing layers, and/or stiction enhancing layers can also be formed as discussed above with reference to FIG. 4c. Solid-state chiral material 104 is then formed on the fabricated transparent electrode array 120 as shown in FIG. 10b. The solid-state chiral material (104) can be formed using the same method as discussed above with reference to FIG. 4b.

Figure 10C:
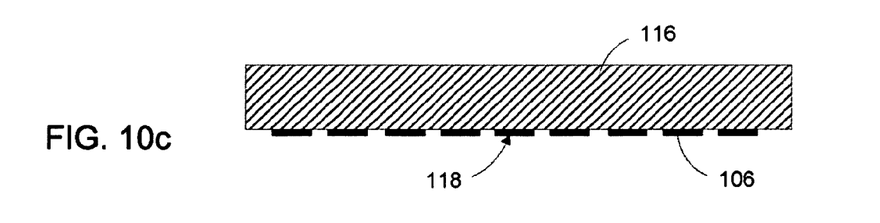

A semiconductor substrate (116) is provided as illustrated in FIG. 10c. The semiconductor substrate comprises electrode array 118 that comprises an array of non-transparent electrodes (e.g. electrode 106) and electrical circuits (not shown), as discussed above with reference to FIG. 4a.

Figure 10D:
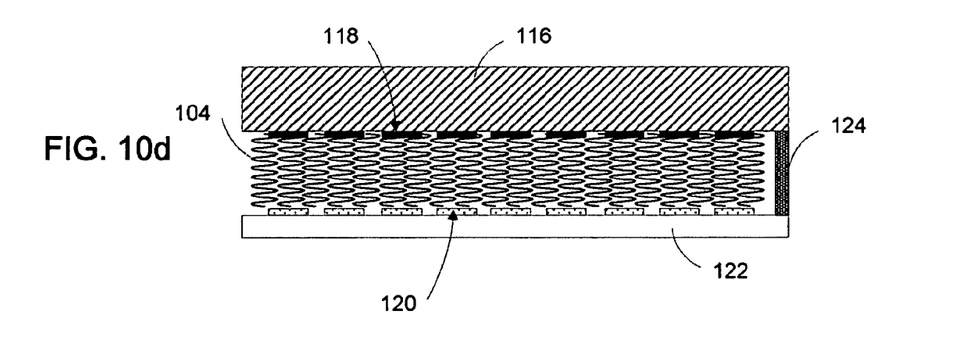

The transparent substrate (122) having formed thereon the transparent electrode array (122) can then be assembled to semiconductor substrate 116, as shown in FIG. 10d. Referring to FIG. 10d, semiconductor substrate 116 is assembled to substrate 122 such that solid-state chiral material (104) is laminated between electrode arrays 118 and 120.

After the assembling, the non-transparent electrodes of electrode array 118 can be associated with the transparent electrodes of electrode array 120 so as to enabling establishments of electrical fields across the solid-state chiral material(s). Shim 124 can be proved for extending electrical connections to the transparent electrodes to the electrical contacting pads on the semiconductor substrate, as discussed above with reference to FIG. 7, which will not be repeated herein. The fabricated spatial light modulator can, though not necessarily, be placed in a package for protection as discussed above with reference to FIG. 8.

Alternative to forming the solid-state chiral material (104) on the transparent substrate (122) as discussed above with reference to FIG. 10b, the solid-state chiral material (104) can be formed on the semiconductor substrate (116) after forming the electrode array 118 and the electrical circuits on the semiconductor substrate (116). The semiconductor substrate (116) with the solid-state chiral material can then be assembled to the transparent substrate 122 having formed thereon electrode array 120.

Figure 11A:
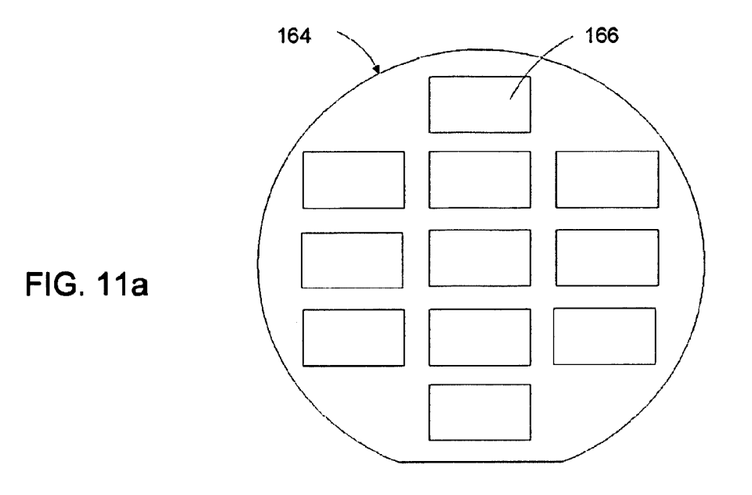
FIG. 11a and FIG. 11b schematically illustrate another exemplary wafer-level fabrication method for making a spatial light modulator having an array of solid-state electro-optical modulators in FIG. 1.
Figure 11B:
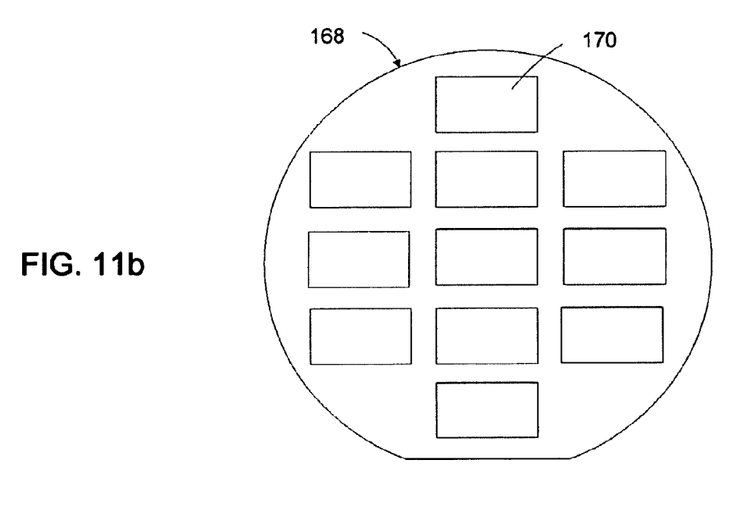

The fabrication method as discussed above with reference to FIG. 10a through FIG. 10d can be performed on the wafer level, as schematically demonstrated in FIG. 11a and FIG. 11b.

Referring to FIG. 11a, wafer 164 is a transparent wafer composed of the same material as transparent substrate 122 in FIG. 10a. The transparent wafer (164) comprises multiple die areas, such as die area 166. The fabrication steps as discussed above with reference to FIG. 10a and FIG. 10b can be performed in each die area on the wafer (164).

Wafer 144 is a semiconductor wafer composed of the same material as the semiconductor substrate 116 in FIG. 10c. The semiconductor wafer comprises multiple die areas, such as die area 170. The fabrication steps as discussed above with reference to FIG. 10c can be performed in each die area on the semiconductor wafer (168).

Semiconductor wafer 168 and the transparent wafer (164) can then be assembled. After assembling, the dies in the two wafers are individually assembled as discussed above with reference to FIG. 10d. The assembled dies are then separated so as to obtain individual spatial light modulators. It is noted that the wafers may or may not have the same number of dies, and as such, some of the dies in one wafer may not be successfully assembled to dies on the other wafer.

During the wafer-level fabrication, a packaging process can be performed so as to obtain packaged spatial light modulators as shown in FIG. 8. For example, before or after fabrications of individual dies but before singulation, a planar package substrate can be attached to the bottom surface (the surface opposite to the top surface wherein the non-electrodes are formed) of the semiconductor wafer. Other suitable materials, such as compliant die attach materials for improving thermal dissipation, for improving the mechanical stability, and/or for other desired purposes. Depending upon whether a package cover is expected for each spatial light modulator in the package, a spacer can be provided so as to maintain a constant distance between the package cover and the package substrate.

Attachment of the spacer can be performed after the singulation. Alternatively, individual package substrates, such as a package substrate with concaves, can be disposed at each location of the spatial light modulator and attached to the bottom surface of the semiconductor wafer.

The SSEO modulators and the array of such modulators can alternatively be fabricated by forming a frame comprising the desired electrodes followed by inserting a selected solid-state chiral material into the frame, as schematically illustrated in FIG. 12a through FIG. 13b.

Figure 12A:
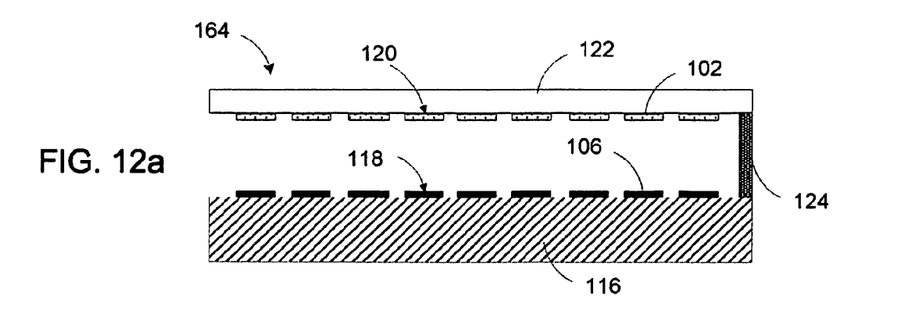
FIG. 12a and FIG. 12b schematically illustrate yet another exemplary method of making a spatial light modulator having an array of solid-state electro-optical modulators in FIG. 1.

Referring to FIG. 12a, frame 164 is provided. The frame (164) comprises semiconductor substrate 116, transparent substrate 122, and spacer 124, which can be the shim as discussed above. The semiconductor substrate (116) comprises electrode array 118 that comprises an array of non-transparent electrodes, such as electrode 106. The semiconductor substrate can be prepared in a way as discussed above with reference to FIG. 4a through FIG. 4d or FIG. 10a through FIG. 10d.

Figure 12B:
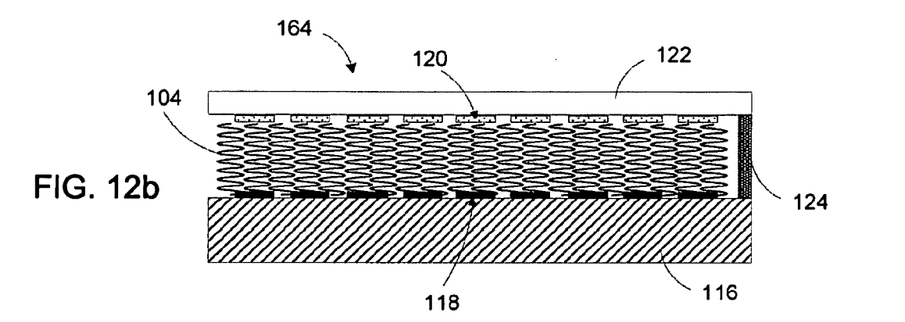

The transparent substrate (122) and the array (120) of transparent electrodes (e.g. electrode 102) formed thereon can be prepared in a way as discussed above with reference to FIG. 4a through FIG. 4d or FIG. 10a through FIG. 10d. The prepared transparent substrate (122) and semiconductor substrate 116 can be bonded together using spacer 124 so as to form frame 164 such that each reflective electrode (e.g. electrode 106) of the electrode array 118 on the semiconductor substrate (116) is aligned to a transparent electrode (e.g. electrode 102) on the transparent substrate (122). The transparent substrate (122) and the semiconductor substrate (116) form an empty space therebetween. Solid-state chiral material 104, which is prepared separately, can be slide into the space of the frame (164), as illustrated in FIG. 12b.

Figure 13A:
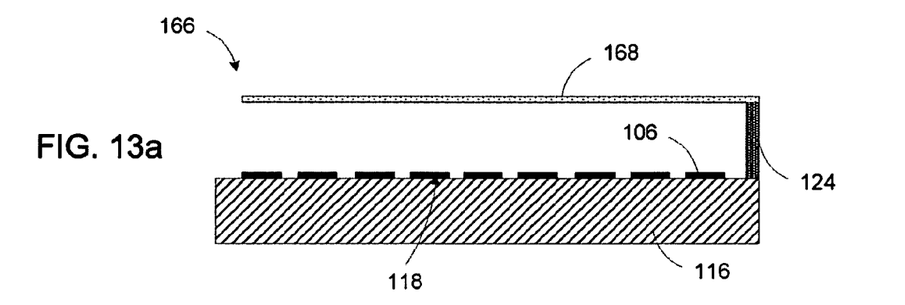
FIG. 13a and FIG. 13b schematically illustrate yet another exemplary method of making a spatial light modulator having an array of solid-state electro-optical modulators in FIG. 1.

When the transparent electrodes (e.g. electrode 102 in FIG. 1) of the SSEO modulators are a continuous electrode layer, such continuous electrode layer can be used to form a frame with the semiconductor substrate and the spacer, as illustrated in FIG. 13a.

Figure 13B:
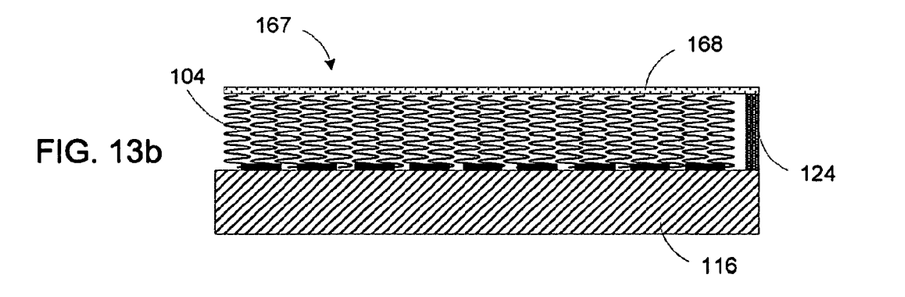

Referring to FIG. 13a, transparent electrode layer 168 is spaced apart from semiconductor substrate (116) by the spacer 124 so as to form frame 166 with a gap between the transparent electrode layer (168) and the semiconductor substrate (116). The prepared solid-state chiral material (104) can then be inserted into the gap to form the spatial light modulator (167), as shown in FIG. 13b.

The SSEO modulator as discussed above has many applications, one of which is spatial light modulators in display systems. As a way of example, an exemplary display system employing a spatial light modulator having an array of SSEO modulators as discussed above is schematically illustrated in FIG. 14.

Figure 14:
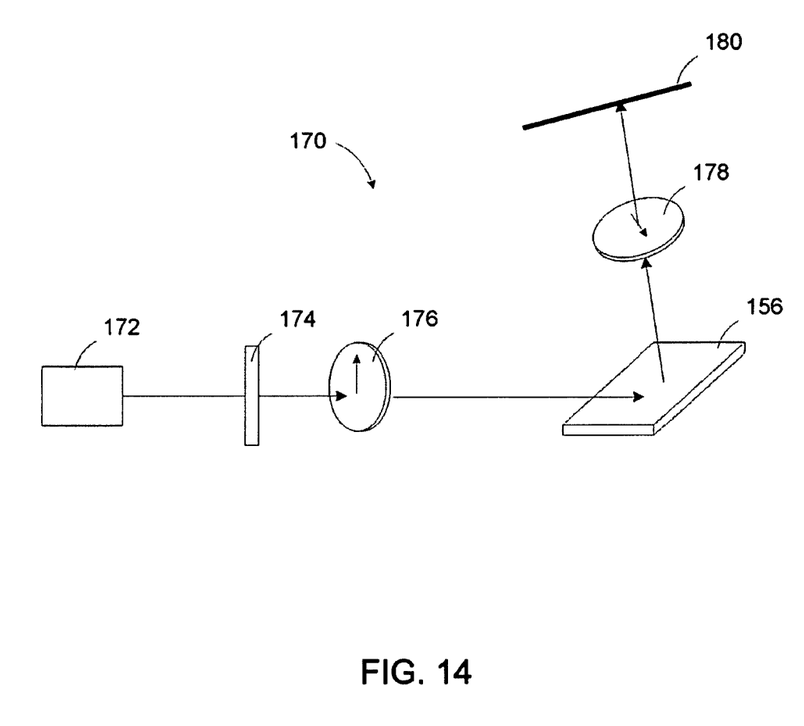
FIG. 14 schematically illustrates an exemplary display system employing a spatial light modulator having an array of solid-state electro-optical modulators in FIG. 1.

Referring to FIG. 14, display system 170 comprises light source 172, polarize 176, spatial light modulator 156, polarization analyzer 178, and display target 180. As an alternative feature, half-waver plate 174 can be provided.

Light source 172 is designed for providing polarized illumination light for the display system; which can be composed of any suitable light emitting devices, such as arc lamps and solid-state light emitting devices (e.g. lasers and light-emitting-diodes (LEDs). When solid-state light emitting devices are used, the light source may comprise an array of solid-state light emitting devices capable of emitting different colors, such as colors selected from red, green, blue, and white. Because a single solid-state light emitting device generally has a narrow characteristic bandwidth that may not be optimal for use in display systems employing spatial light modulators, multiple solid-state light emitting devices can be used for providing light of each color so as to achieve optimal bandwidth for specific display systems. For example, multiple lasers or LEDs with slightly different characteristic spectra, such as 20 nm or less wavelength separation, can be used to produce a color light such that the characteristic spectra of the multiple lasers or LEDs together form an optimal spectrum profile of the display system. Exemplary laser sources are vertical cavity surface emitting lasers (VCSEL) and Novalux™ extended cavity surface emitting lasers (NECSEL), or any other suitable laser emitting devices.

Polarizer 176 is provided for passing the illumination light (or the portion of the illumination light) with a pre-defined polarization direction. The polarizer (176) has a polarization direction that is preferably perpendicular to that of the polarization analyzer 178.

The spatial light modulator (156) comprises an array of SSEO modulators as discussed above for modulating the polarized illumination light incident thereto into modulated light with a polarization direction different from that of the light incident to the spatial light modulator (156).

The modulated light is directed to polarization analyzer 178 that has a polarization direction perpendicular to that of the polarizer 176. With the above configuration, the modulated light from a SSEO modulator of the spatial light modulator (156) can be stopped by the polarization analyzer (178) when the electrical field applied to the SSEO modulator is substantially zero. The stopped modulated light from the SSEO modulator results in a dark pixel on the display target. The modulated light from a SSEO modulator in the spatial light modulator with a non-zero electrical field can pass through the polarization analyzer (178) and arrived at the display target (180)—resulting in a bright pixel on the display target (180). The combination of the dark and bright pixels on the display target forms the desired image on the display target. Gray-scaled imaged can be formed using a pulse-width modulation technique; and color imaged can be formed using a combination of a pulse-width-modulation technique and a sequential-field-illumination technique or other suitable techniques.

As the alternative feature, half-waver plate 174 can be provided for pre-polarizing the illumination light from the light source. For improving the optical efficiency, such as the brightness of the image produced on the display target, other optical elements can be provided. For example, a polarization converter can be provided before polarizer 176 for converting substantially all component of the illumination light from the light source into one component with the polarization direction defined by the polarizer (176). As such substantially all illumination light can pass through the polarizer (176).

The display target can be a screen on a wall or the like, or can be a member of a rear projection system, such as a rear projection television. The display system can be any suitable display system, such as a front projector, a rear projection television, or a display unit for use in other systems, such as mobile telephones, personal data assistants (PDAs), handheld or portable computers, camcorders, video game consoles, and other image displaying devices, such as electronic billboards and aesthetic structures.

It will be appreciated by those of skill in the art that a new and useful solid-state electro-optical modulator and a spatial light modulator having an array of solid-state electro-optical modulators have been described herein. In view of the many possible embodiments, however, it should be recognized that the embodiments described herein with respect to the drawing figures are meant to be illustrative only and should not be taken as limiting the scope of what is claimed. Those of skill in the art will recognize that the illustrated embodiments can be modified in arrangement and detail. Therefore, the devices and methods as described herein contemplate all such embodiments as may come within the scope of the following claims and equivalents thereof.

I claim:

1. A method of displaying an image, comprising:
providing a spatial light modulator that comprises an array of individually addressable pixels, wherein each pixel comprises:
a solid-state chiral material that is disposed between first and second electrodes such that an electrical field can be established across the solid-state chiral material;
directing a beam of polarized light to the pixels of the spatial light modulator;
modulating the pixels of the spatial light modulator based on the image to be displayed by adjusting the electrical fields applied to the solid-state chiral materials of the pixels;
passing the light from the pixels of the spatial light modulator through a polarizer; and
directing the light after the polarizer onto a display target.

2. The method of claim 1, wherein the polarized light is incident to the solid-state chiral materials such that the incident polarized light is substantially not-parallel to a primary axis of the solid-state chiral material of the pixels.

3. The method of claim 1, wherein the step of directing the beam of polarized light to the pixels of the spatial light modulator further comprises:
directing the beam of polarized light to the pixels of the spatial light modulator through another polarizer, wherein said another polarizer has a polarization direction is substantially perpendicular to a polarization direction of said polarizer that is disposed after the spatial light modulator.

4. A display system, comprising:
a light source providing a light;
a spatial light modulator comprising an array of pixels, each pixel comprising:
a solid-state chiral material that is disposed between first and second electrodes such that an electrical field can be established across the solid-state chiral material;
a first polarizer having a first polarization direction; and
a second polarizer having a second polarization direction that is substantially perpendicular to the first polarization direction; and a set of optical elements for directing the light toward the spatial light modulator and for directing the light from the spatial light modulator onto a display target.

5. The system of claim 4, further comprising:
a half-wave plate disposed between the light source and the spatial light modulator.

6. The system of claim 4, wherein the first polarizer is disposed between the half-wave plate and the spatial light modulator; and the second polarizer is disposed between the spatial light modulator and the display target.

7. The system of claim 4, wherein the first electrode is transmissive to the visible light; and wherein the second electrode is reflective to the visible light.

8. The system of claim 7, wherein the first electrode comprises an indium-titanate-oxide layer; and wherein the solid-state chiral material comprises an inorganic material or an organic material.

* * * * *